(12) United States Patent
Iftime et al.

(10) Patent No.: US 10,138,340 B2
(45) Date of Patent: Nov. 27, 2018

(54) LOW VOLATILITY, HIGH EFFICIENCY GAS BARRIER COATING FOR CRYO-COMPRESSED HYDROGEN TANKS

(71) Applicant: PALO ALTO RESEARCH CENTER INCORPORATED, Palo Alto, CA (US)

(72) Inventors: Gabriel Iftime, Dublin, CA (US); Quentin Van Overmeere, Mountain View, CA (US); David Mathew Johnson, San Francisco, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 0 days.

(21) Appl. No.: 15/290,645

(22) Filed: Oct. 11, 2016

(65) Prior Publication Data

US 2018/0100047 A1 Apr. 12, 2018

(51) Int. Cl.
*F17C 1/00* (2006.01)
*C08J 7/04* (2006.01)
(Continued)

(52) U.S. Cl.
CPC ............ *C08J 7/047* (2013.01); *B05C 5/0254* (2013.01); *B05D 1/265* (2013.01); *B05D 3/007* (2013.01);
(Continued)

(58) Field of Classification Search
CPC .... C08J 7/047; C08J 2300/00; C08J 2463/00; F17C 1/12; F17C 2203/0663; F17C 2203/0619; F17C 2203/0607; F17C 2203/0391; F17C 2270/0168; F17C 2221/012; B05C 5/0254; B05D 1/265; B05D 3/007; C08K 3/04; C01B 3/00
(Continued)

(56) References Cited

U.S. PATENT DOCUMENTS

2007/0154771 A1* 7/2007 Jang .......................... C08J 5/04
429/514
2008/0149900 A1* 6/2008 Jang ...................... H01B 1/122
252/511

(Continued)

OTHER PUBLICATIONS

Salvador M. Aceves, et al., Safe, long range, inexpensive and rapidly refuelable hydrogen vehicles with cryogenic pressure vessels, International Journal of Hydrogen Energy, 38:5,Feb. 19, 2013, pp. 2480-2489.

(Continued)

*Primary Examiner* — Kareen Thomas
(74) *Attorney, Agent, or Firm* — Miller Nash Graham & Dunn LLP

(57) ABSTRACT

A bilayer object consisting of a carbon fiber reinforced polymer substrate coated with a composition of matter comprising horizontally aligned exfoliated graphene sheets dispersed in an epoxy binder. A method includes depositing graphene into a hardener, mixing the hardener and the graphene to produce a homogenous composite mixture, adding a resin material to the composite mixture to produce an epoxy graphene material, coating a structure with the epoxy graphene material, aligning the graphene sheets in the in-plane orientation, and curing the epoxy graphene material.

3 Claims, 4 Drawing Sheets

(51) Int. Cl.
    *C01B 3/00*    (2006.01)
    *C08K 3/04*    (2006.01)
    *B05D 3/00*    (2006.01)
    *B05D 1/26*    (2006.01)
    *B05C 5/02*    (2006.01)
    *F17C 1/12*    (2006.01)

(52) U.S. Cl.
    CPC .................. *C01B 3/00* (2013.01); *C08K 3/04* (2013.01); *F17C 1/12* (2013.01); *C08J 2300/00* (2013.01); *C08J 2463/00* (2013.01); *F17C 2203/0391* (2013.01); *F17C 2203/0607* (2013.01); *F17C 2203/0619* (2013.01); *F17C 2203/0663* (2013.01); *F17C 2221/012* (2013.01); *F17C 2270/0168* (2013.01)

(58) Field of Classification Search
    USPC ........................................ 220/560.04–560.15
    See application file for complete search history.

(56) References Cited

U.S. PATENT DOCUMENTS

| | | | | |
|---|---|---|---|---|
| 2008/0268318 | A1* | 10/2008 | Jang | .................... H01M 8/0206 |
| | | | | 429/492 |
| 2015/0024270 | A1* | 1/2015 | Park | .................... H01M 4/667 |
| | | | | 429/221 |
| 2016/0176111 | A1 | 6/2016 | Paschkewitz et al. | |
| 2016/0226042 | A1* | 8/2016 | Hartmann | ........... H01M 2/1094 |
| 2016/0226114 | A1* | 8/2016 | Hartmann | .............. C08G 18/10 |
| 2017/0058070 | A1 | 3/2017 | Iftime et al. | |
| 2017/0200943 | A1* | 7/2017 | Kawakami | ........... H01M 4/366 |
| 2017/0226351 | A9* | 8/2017 | Fornes | ..................... C09D 5/24 |

OTHER PUBLICATIONS

Salvador M. Aceves, et al., "Compact (L)H2 Storage with Extended Dormancy in Cryogenic Pressure Vessels," Project ID ST003, Lawrence Livermore National Laboratory, Jun. 8, 2010.

Yanbin Cui, et al., "Gas barrier performance of graphene/polymer nanocomposites," Carbon, 98, Mar. 2016, pp. 313-333.

Ingo Pinnau and Lora G. Toy, "Gas and vapor transport properties of amorphous perfluorinated copolymer membranes based on 2,2-bistrifluoromethyl-4,5-difluoro-1,3-dioxole/tetrafluoroethylene," J. Membrane Sci., 109:1, Jan. 10, 1996, pp. 125-133.

Ahmad Al-Jabareen, et al., "Improving the oxygen barrier properties of polyethylene terephthalate by graphite nanoplatelets," J. Appl. Polym. Sci., 2012, 128, 1534-1539.

Matthew M. Malwitz, et al., Layered structures of shear-oriented and multilayered PEO/silicate nanocomposite films, Phys. Chem. Chem. Phys. 2004, 6(11), pp. 2977-2982.

* cited by examiner

LOW VOLATILITY, HIGH EFFICIENCY GAS BARRIER COATING FOR CRYO-COMPRESSED HYDROGEN TANKS

TECHNICAL FIELD

This disclosure relates to cryo-compressed hydrogen tanks, more particularly to thermal insulation for these tanks.

BACKGROUND

Hydrogen may act as an energy source or carrier for many applications, including as a fuel for transportation. Transportation applications, such as for cars, require compact, and preferably lightweight, hydrogen storage. Hydrogen has good energy density by weight by typically poor energy density by volume, so compact storage requires pressurization of the hydrogen.

Cryo-compression uses cold hydrogen stored in tanks that can handle up to 350 bars (5000 pounds psi) of internal pressure. As the hydrogen warms up from heat transferred in from the environment, the tank has more time before it needs to vent the hydrogen. In transportation applications, the vehicle has used enough hydrogen by that time to keep the pressures below the venting limit.

Current cryo-compressed hydrogen tanks with vacuum insulation current satisfy DOE's 2017 targets for energy density. However, the thermal insulation performance remains satisfactory for only 3 weeks or so, as the vacuum quality degrades, as discussed by S M Aceves, et al., in the *International Journal of Hydrogen Energy*, vol. 38 (2013), pp. 2480-2489.

These tanks typically have an architecture with an inner pressure vessel with a pressure resistance up to 350 bar, made of aluminum wrapped with carbon-fiber reinforced polymer (CFRP). A vacuum and numerous sheets of high reflective metalized plastic provide high performance thermal insulation. Currently no material exists to replace the high vacuum without an unacceptable decrease in the volumetric energy density. It has been determined that the main reason for pressure increase in the vacuum liner is the outgassing of volatile hydrocarbon-based resins present in the CFRP epoxies [Reference: S. Aceves et. al. Project # ST003, Hydrogen AMR (2010)]. Therefore, it appears that the only viable solution to extend the vacuum lifetime is to mitigate the outgassing of the epoxy resin from the CFRP tank walls.

One possible option would be to use low outgassing epoxy resins, such as those for space applications, for fabrication of a CFRP tank with reduced outgassing. CFRP typically contains 40% epoxy resin. Low outgassing resins are generally very viscous and cost more than the carbon fibers themselves, and are therefore not suitable for fabricating a cost-effective CFRP tank. A gas barrier coating may protect the vacuum exposed surface of the CFRP wall and may represent a viable, low-cost solution. Current gas barrier approaches have resulted in expensive, ineffective or difficult to implement gas barriers. For example, a UV-cured polymer coating actually result in increased outgassing. Conventional gas barrier polymers such as EVOH (ethylene vinyl alcohol) and oriented PET (polyethylene terephthalate) require high temperature extrusion, typically over 250° C., which is incompatible with CFRP processes. It is difficult to adhere metal foils onto large CFRP surfaces without defects and vacuum deposition of metallic gas barriers costs too much for large surfaces.

SUMMARY

An embodiment consists of a bilayer object consisting of a carbon fiber reinforced polymer substrate coated with a composition of matter comprising horizontally aligned exfoliated graphene sheets dispersed in an epoxy binder.

Another embodiment consists of a method including depositing graphene into a hardener, mixing the hardener and the graphene to produce a homogenous composite mixture, adding a resin material to the composite mixture to produce an epoxy graphene material, coating a structure with the epoxy graphene material, aligning the graphene sheets in the in-plane orientation, and curing the epoxy graphene material.

A cured composition of matter comprising horizontally aligned graphene sheets dispersed in a NASA approved low outgassing epoxy.

DETAILED DESCRIPTION OF THE EMBODIMENTS

In some embodiments, the inner vessel is made of aluminum wrapped with carbon-fiber reinforced polymer (CFRP). These tanks typically satisfy the Department of Energy's 2017 targets for energy density. Numerous sheets of high reflective metalized plastic and a vacuum provide high performance thermal insulation. No currently available material can replace the high vacuum without an unacceptable decrease in the volumetric energy density. The only viable solution to extend the vacuum lifetime is to mitigate the outgassing of the epoxy resin in the CFRP.

The embodiments here provide protection to the vacuum-exposed surface of the CFRP wall via a gas barrier coating that is inexpensive, effective and easier to implement. One embodiment uses a formulation that contains chemically bonded graphene sheets or flakes. The graphene sheets or flakes are functionalized with reactive groups. In one embodiment the reactive particles are amino-functionalized graphene sheets that act as hardener replacement to create cross-linked graphene-polymer structures by reaction with epoxies materials. Chemical linking of the epoxies to the non-volatile graphene renders the whole coating nonvolatile. The approach to realizing this structure has been disclosed in U.S. co-pending patent application Ser. No. 14/840,913. In another embodiment the formulation uses graphene oxide particles that are cured by reaction of the hydroxyl (OH) and carboxylic acid groups present onto the graphene sheets with epoxy groups from the epoxy materials.

Another embodiment uses dispersed non-functionalized graphene sheets in low outgassing NASA approved two component epoxy systems. Graphene acts as gas barrier and unlike standard epoxies used in CFRP fabrication the cured structure is non-volatile. This composition is fabricated by using a high shear mixing such as Resodyne™ acoustic mixer to provide a homogeneous formulation consisting first of graphene dispersed into the hardener. This composition is stable in time. A cured epoxy layer is created by mixing the composite formulation described above with an appropriate amount of epoxy material. Curing at room or high temperature produces hard highly efficient protective gas barrier.

Figure 1:
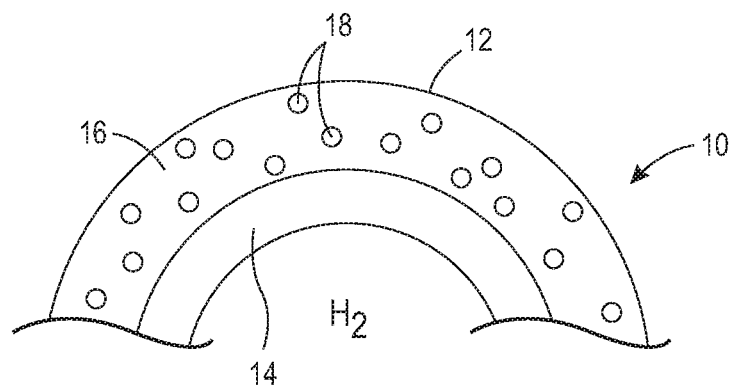
FIG. 1 shows a prior art embodiment of a tank wall.

FIG. 1 shows a cross-section of one embodiment of a currently available cryo-compressed tank 10. The stainless steel shell 12 encases the carbon-fiber reinforced polymer shell 14. The area 16 between the shell 12 and the CFRP 14 contains hydrocarbon vapors 18.

Figure 2:
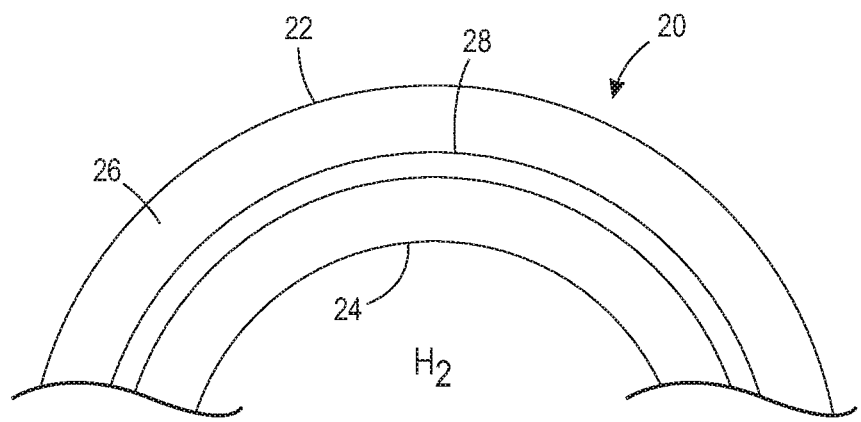
FIG. 2 shows an embodiment of a tank wall having a non-volatile gas barrier.

In contrast, FIG. 2 shows a cross-section of a tank in accordance with the current embodiments. In this example, the tank 20 has a stainless steel shell 22 and a CFRP inner layer 24. A gas barrier coating 28 has exceptionally low gas permeation rates enabled by inter-planar stacked graphene sheets. The region 26 has very little, if any, hydrocarbon vapors. The barrier also has mechanical reliability under thermal cycling due to outstanding bonding strength between the coating and the CFRP walls, which is achieved by interpenetration and bonding of the graphene sheets onto graphene edges of the carbon fibers. The gas barrier coating also has low outgassing due to chemically linked polymer-to-graphene networks that make the protective coating non-volatile. The term 'non-volatile' as used here means that that the material or its components do not evaporate at normal temperature and pressure.

Similarly, the term low out-gassing as used here means that the material meets the NASA standard ASTM E595-07. In this standard, the materials undergo preconditioning at 50 percent relative humidity and weighed. The materials then go into the test chamber for 24 hours at a temperature of 125° C. and the vacuum at a minimum of $5 \times 10^{-5}$ torr. During that time, materials that outgas from the sample escape through a port in the test chamber and condense on a cooled (25° C.) collector plate. The material in the chamber and the material that collects on the collector plate are then weighed to determine the total mass lost (TML) by the material and the amount of collected volatile condensable materials (CVCM) on the collector plate. If CVCM<0.1 percent and TML<1 percent, the material passes. Materials that pass the test are considered to be 'low-outgassing.

The gas barrier coating contains optimal plate-like particles The most promising particles are exfoliated graphene sheets, which have been shown to decrease the permeation rate of oxygen by 1000× when compared to the same polymer without graphene. The low permeation rate results from the creation of a tortuous diffusion path for the penetrating gas molecules.

Figure 3:
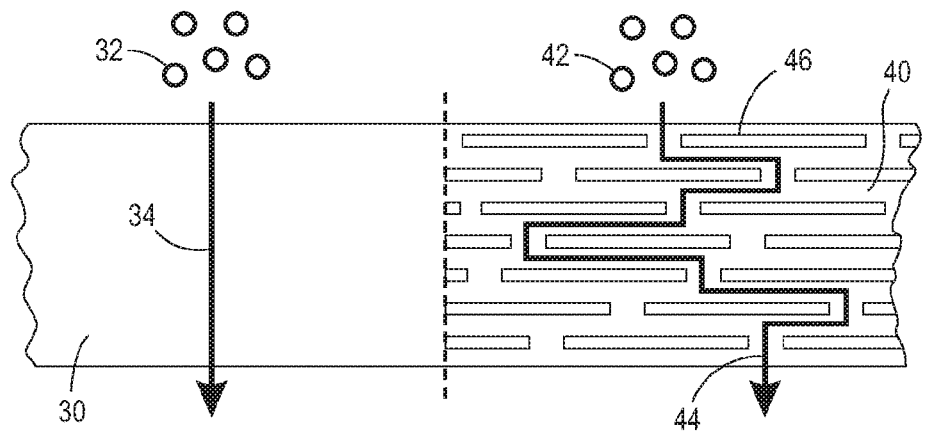
FIG. 3 shows a comparison of gas diffusion paths.

FIG. 3 contrasts a typical polymer film compared to a polymer-graphene film. The typical polymer film 30 has a relatively short pathway 34. The gas molecules 32 stored in the tank travel the short pathway, increasing the likelihood of the gas molecules outgassing. The polymer 40 has within it exfoliated, plate-like, graphene sheets 46. The tortuous path 44 that the gas molecules 42 take make it difficult for them to escape, resulting in a low-outgassing coating. The permeation rate is expected to be decreased even more, an additional 10×, for the hydrocarbons outgassing from the CFRP. Based upon data published by A. Al. Jabareen et al., in the *Journal of Applied Polymer Science*, (2012) pp. 1534-39, a gas barrier with 1.5% graphene is expected to have hydrocarbon permeability<0.01 cc·mil/100 in²/24 h/atm. The inventors have performed calculations that indicate that this permeability would enable years of vacuum insulation performance before any servicing is needed.

Figure 4:
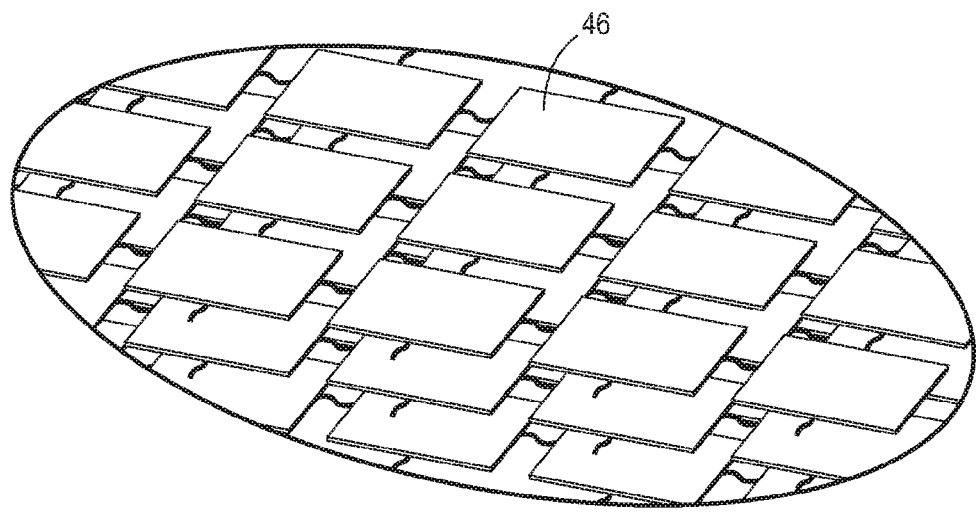
FIG. 4 shows chemically linked graphene networks.

Unlike organic molecules, the inorganic graphene particles are not volatile. While the polymer in which the graphene sheets are embedded could be volatile, bonding the polymer chains directly to the graphene sheets can eliminate any volatility, preventing outgassing from the structure, as described with such as functionalized, chemically linked graphene sheets 46, such as amino graphene or graphene oxide, in one embodiment, shown in FIG. 4. Alternatively, if outgassing epoxy materials are being used then non-functional horizontally-aligned graphene sheets can be dispersed and aligned to produce the nonvolatile gas barrier coating as shown in FIG. 5.

Figure 5:
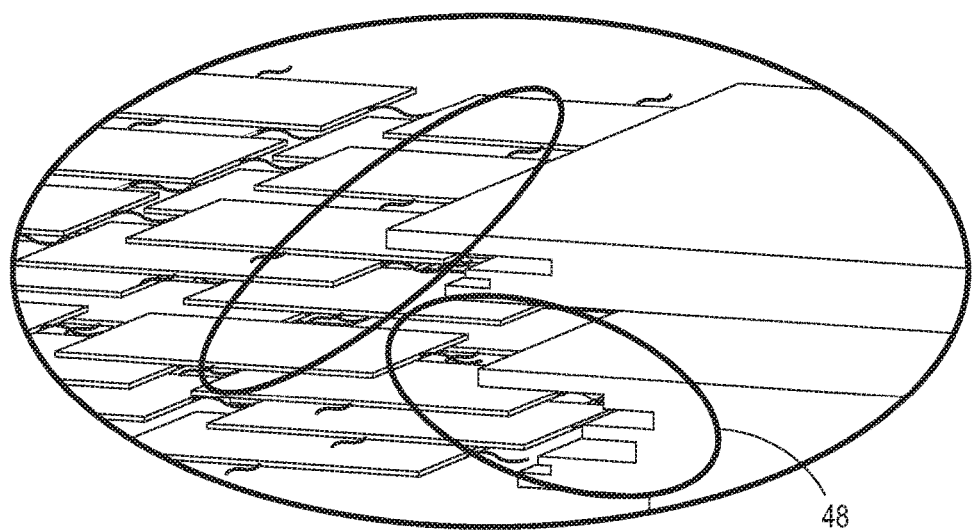
FIG. 5 shows boding of graphene sheets onto the edges of carbon fibers from the CFRP tank wall.

As can be seen in FIG. 5, the graphene sheets 46 are bonded on to the edges of carbon fibers from the CRFP tank wall shown in the highlighted regions 48. This produces a coating that does not delaminate, as would happen with a protective coating made from a different material having different chemical and thermal behaviors.

A tank with 10 micrometers coating of the proposed protective gas barrier will only need basic vacuum servicing once per year. Thicker barrier layers have the potential for further vacuum lifetime improvements. Even coatings 100 micrometers think will have a negligible impact on the volumetric and gravimetric density of the storage tank. This technology can be easily applied to design tanks for other gases typically stored below room temperature, such a liquid natural gas. The embodiments here enable cryo-compressed hydrogen tanks with vacuum insulation lifetimes 20× longer than today's state-of-the-art cryogenic tanks. This enables cryo-compressed hydrogen tanks for automotive applications with a heat leakage rate below 5 W per 100 liter storage capacity during 10 years. The thickness of the protective layer can be anywhere 1 micron to 1 millimeter.

Figure 6:
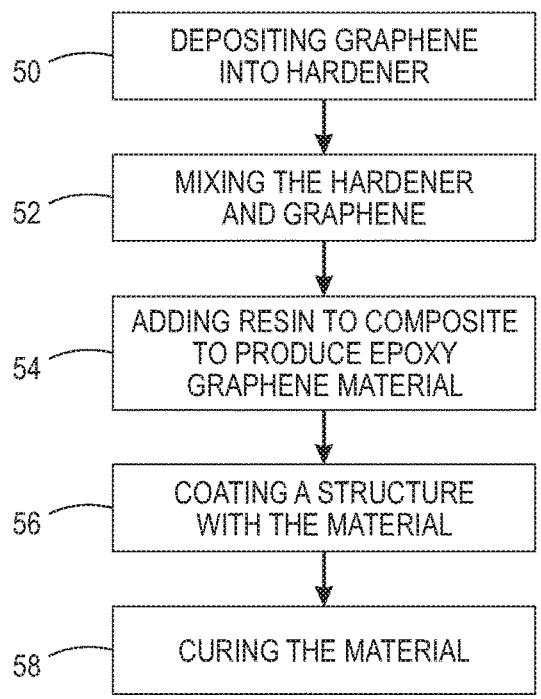
FIG. 6 shows a flowchart of an embodiment of a method to coat an item with a non-volatile gas barrier.
Figure 7:
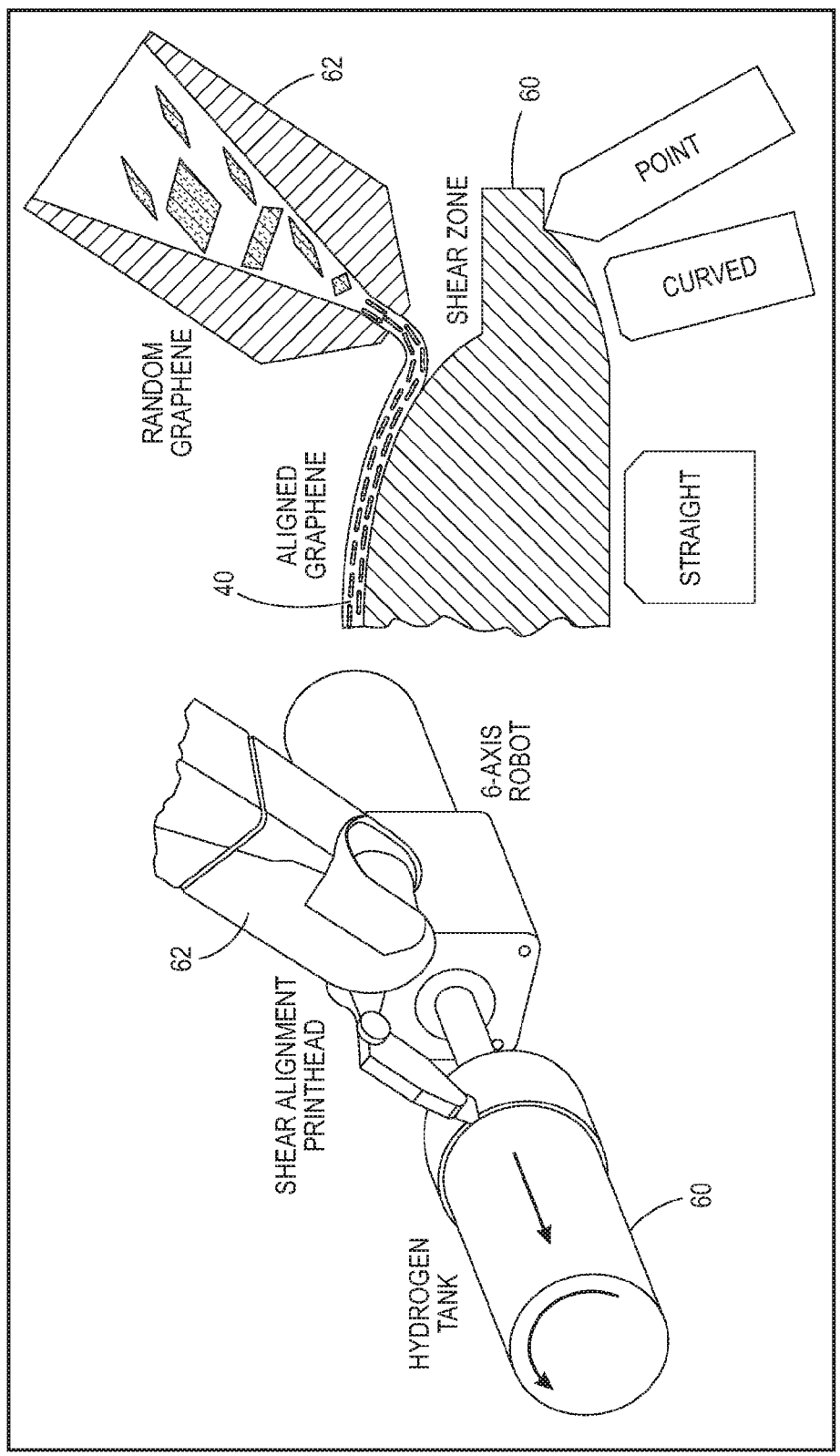
FIG. 7 shows a six axis deposition system.

FIG. 6 shows an embodiment of a process for manufacturing cured graphene/epoxy coating formulations. In this embodiment, a two component epoxy is used, one that includes a hardener and a resin. Initially, graphene is deposited into the hardener component at 50. The process then mixes the hardener and the graphene at 52. In one embodiment the graphene is functionalized graphene such as amino-graphene or graphene oxide sheets. In this case, the amount of hardener required for curing is decreased accordingly in order to compensate for the additional curing functional groups (amino, carboxylic acid or or hydroxyl). In another embodiment non-functionalized graphene sheets are dispersed in low outgassing two component epoxy systems, as defined by the NASA standard mentioned above. In both embodiments graphene acts as a gas barrier and unlike standard epoxies used in CFRP fabrication the cured structure is nonvolatile.

In one embodiment, the process uses high shear mixing, such as with a Resodyne acoustic mixer or Thinky planetary mixer to produce a homogenous composite formulation consisting first of graphene dispersed into the hardener. This composition is stable in time.

A cured epoxy layer is created by mixing the composite from 52 with the resin component to produce epoxy graphene material at 54. This mixture is then used to coat a structure such as the inner surfaces of a cryo-compressed hydrogen tank at 56. In one embodiment, a 6-axis nozzle dispenser could be used. Once dispensed, the coating then undergoes curing, either at high temperature or room temperature. These produce hard, highly efficient, protective barriers.

Highly dispersed exfoliated graphene sheets are a necessary but not a sufficient condition to achieve outstanding gas barrier performance. Another critical requirement is the creation of stacked multilayered aligned graphene sheets structures. Shear based alignment of nanoplatelets has been demonstrated with a number of polymeric and particle systems [Reference: M. M. Malwitz et al., Phys. Chem. Chem. Phys. 6.11 (2004): 2977-2982]. This particular method of alignment has the advantage of being both high throughput and readily compatible with rotary coating. The tank is loaded onto a rotary actuator and a custom developed printhead with a high shear slot die or nozzle will be passed along the profile of the tank using a robotic arm to create an even coating around the tank FIG. 8 shows an embodiment of a six-axis deposition system used for coating irregularly shaped surfaces. On the left side, the system 62 is shown coating a tank 62. On the right side, the nozzle 62 is applying the aligned graphene sheets 46 onto the tank 60. An example of such a system is disclosed in US Patent Publication 20160176111.

In this manner, a relatively impermeable gas barrier can be formed on many different types of structures. The process is inexpensive, efficient and easy to manufacture compared to current gas barrier coatings.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A bilayer object consisting of a carbon fiber reinforced polymer substrate coated with a composition of matter comprising horizontally aligned exfoliated graphene sheets dispersed in an epoxy binder, wherein the composition of matter has a gas permeability less than 0.01 cc·mil/100 $in^2/24$ h/atm and outgassing properties of CVCM of less than 0.1 percent and TML less than 1 percent.

2. The object of claim 1 wherein the composition of matter consists of chemically bonded horizontally aligned graphene sheets bonded by epoxy linkers.

3. A bilayer object consisting of a carbon fiber reinforced polymer substrate coated with a composition of matter comprising horizontally aligned exfoliated graphene sheets dispersed in an epoxy binder, wherein the composition of matter consists of non-functionalized graphene sheets dispersed in low outgassing epoxy.

* * * * *